E. S. MUSGRAVE.
MEANS FOR USE IN POACHING EGGS.
APPLICATION FILED NOV. 22, 1920.
1,417,679.
Patented May 30, 1922.
2 SHEETS—SHEET 1.
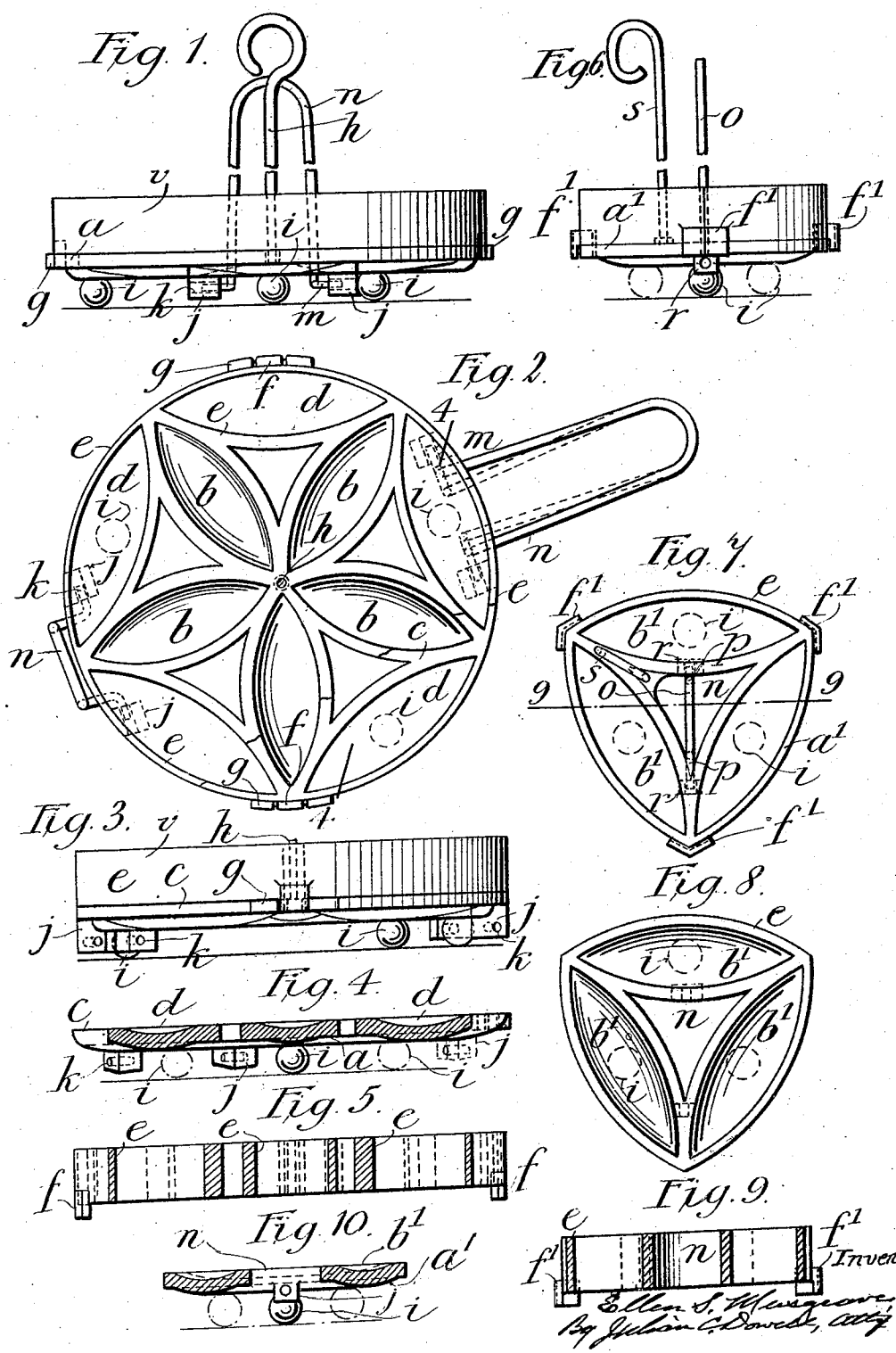

E. S. MUSGRAVE.
MEANS FOR USE IN POACHING EGGS.
APPLICATION FILED NOV. 22, 1920.
1,417,679.
Patented May 30, 1922.
2 SHEETS—SHEET 2.
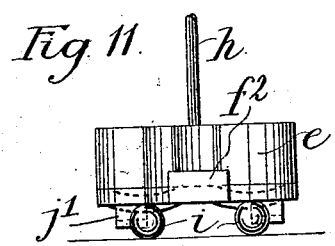
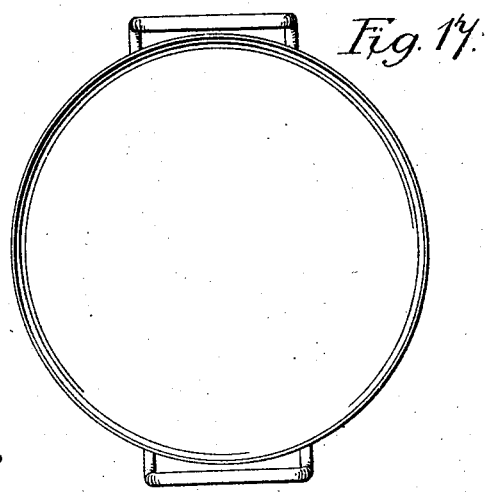
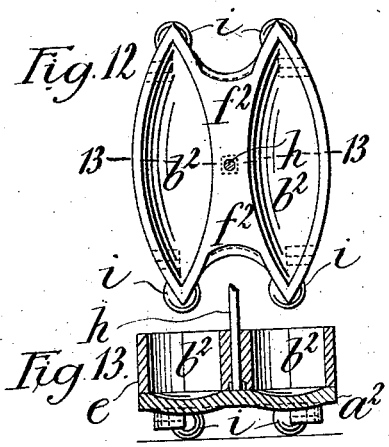
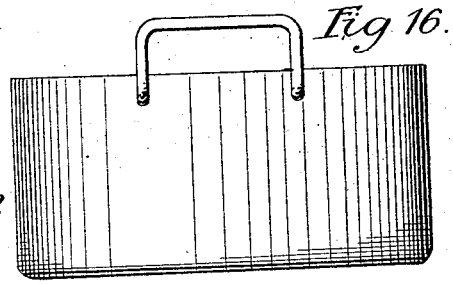
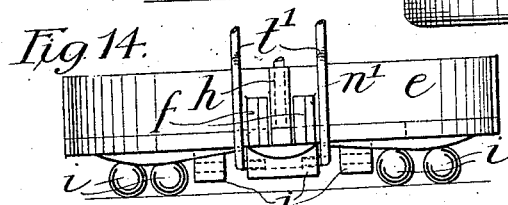
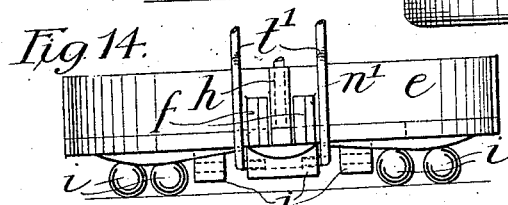
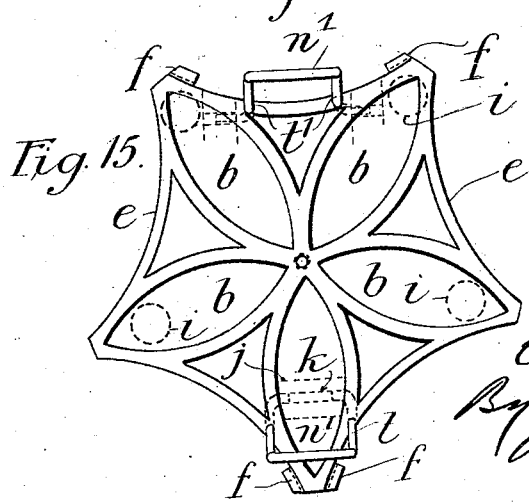

UNITED STATES PATENT OFFICE.

ELLEN SUSAN MUSGRAVE, OF AMERSHAM COMMON, ENGLAND.

MEANS FOR USE IN POACHING EGGS.

1,417,679.  Specification of Letters Patent.  Patented May 30, 1922.

Application filed November 22, 1920. Serial No. 425,879.

*To all whom it may concern:*

Be it known that I, ELLEN SUSAN MUSGRAVE, a subject of the King of Great Britain and Ireland, residing at Amersham Common, in the county of Bucks, England, have invented Improvements in Means for Use in Poaching Eggs, of which the following is a specification.

This invention has reference to means for use in poaching eggs, the object being to provide an arrangement which will enable a number of eggs to be poached at one time in a single cooking vessel without risk of one egg adhering to another upon a serving member which after removal from the cooking vessel can be instantly despatched minus the egg separating means in a highly heated condition to the consumption table.

According thereto the means comprise a flat base portion $a$ resembling a cruet formed with a number of hollows and an upper detachable egg separating portion $v$ formed with apertures or bottomless compartments $e$ corresponding in number, size and shape with the hollows, both portions being provided with handles, which may be detachable and means being provided for positioning or connecting them together so that the upper portion forms an upwardly extending wall around each of the several hollows. The eggs are as usual broken into the apertures or compartments which are closed at the bottom by the hollowed parts of the connected base portion and the connected base and upper portions are then immersed in water in a cooking vessel. When the cooking operation is completed the connected portions are removed from the vessel, and the upper portion $v$ is bodily detached, the poached eggs then resting in the hollows of the base portion $a$ which can be placed on a dish ready for the table.

The base portion $a$ may be made of any suitable material such as earthenware or glass which will withstand heat or of enamelled or plated metal, whilst the upper portion $v$ is preferably of enamelled or plated metal but may be of any other suitable material.

Several constructional examples of poachers are illustrated in the accompanying drawings. Fig. 1 being a side elevation of one form with one handle removed. Fig. 2 a plan with one handle in a different position to another and a part broken away and Fig. 3 an elevation with one handle partly broken away and two handles removed. Fig. 4 is a section of the lower part of the device, taken on the line 4—4 Fig. 2 and Fig. 5 is a section, taken on the same lines, of the upper part of the device. Fig. 6 is a side elevation of another form of poacher complete. Fig. 7 being a corresponding plan. Fig. 8 is a plan of the lower part of such device and Figs. 9 and 10 respectively sections of the upper and lower parts thereof, the sections being taken on the line 9—9 of Fig. 7. Fig. 11 is an elevation of a third form of device, Fig. 12 is a plan and Fig. 13 a section on the line 13—13 of Fig. 12. Fig. 14 is an elevation and Fig. 15 a plan of yet another form of device. Fig. 16 is an elevation and Fig. 17 a plan of a vessel adapted to receive any device according to the invention.

As shown in Figs. 1 to 5 a circular base $a$ is employed having five depressions $b$ radiating from the centre to the periphery and bounded by a pentagonal margin $c$ between which and the circumference of the base five other depressions $d$ are formed, all the edges of the depressions being curved lines. The upper removable member $v$ associated with the base $a$, has its walls $e$ shaped to correspond and may be provided with a pair of diametrically arranged lugs $f$ each lug $f$ being adapted to seat between a pair of lugs $g$ upon the base $a$ so as to hold the two parts against angular displacement. The upper member $v$ may be fitted with a central handle $h$ by which it can be placed in position and the weight of such member may be relied upon to maintain the requisite tightness between the same and the base. The base may be provided with say three supporting feet $i$ and with two pairs of lugs $j$ at the underside bored as at $k$ for the reception of lateral extensions $m$ of a pair of looped handles $n$ which can be sprung into and out of position and are movable about the extensions hingewise.

A smaller device shown in Figs. 6 to 10 may comprise a base $a'$ having three similar poaching regions $b'$ with their major axes arranged triangularly, lugs $f'$ or equivalent means being located at the apices of such regions for holding the upper member and base in position. In such a case there may be a central hollow space $n$ in both the base $a$ and upper member so that the latter can be slipped over a looped handle $o$ of the kind referred to, the lateral extensions $p$ whereof cooperate with a single pair of lugs $r$ diametrically arranged near the central opening $n$ in the base $a$. The removal of the upper member and its replacement may be effected by a handle $s$ extending rigidly from the said member, to one side of the lifting handle $o$ for the base.

In the example shown in Figs. 11, 12 and 13 the base $a^2$ is formed with a pair of depressions $b^2$ arranged as shown and the upper member shaped to correspond. In this case the upper member is provided with a pair of positioning lugs $f^2$ and the base with pair of lugs $j'$ for the reception of handles equivalent to those shown at $n$ in Figs. 1 and 2.

In an analogous way the apparatus first described may be made to poach five eggs at a time in lieu of ten.

Such a modification is shown in Figs. 14 and 15 which also exemplifies the upper member as connected to the base $a$ by forming the handles $n'$ with knees $t$ which when the handles are erect bear upon the walls $e$ of the upper member thereby positively preventing independent lifting of the upper member whilst the eggs are being poached, which may be done by inserting the cruet like device in the vessel shown in Figs. 16 and 17.

The said knees or equivalent fastening means may be formed or applied to the handles of any of the other forms of device illustrated.

Summarized the advantages may be thus stated.

1. It altogether does away with the unsatisfactory present method of dishing up with an egg slice, etc.

2. The shape of the depression assists or simplifies serving with a table spoon, as both are much about the same shape.

3. The depressions are just deep enough to keep the eggs in position on the cruet when the upper portion is removed.

4. By keeping the eggs on the cruet in which they have been cooked it prevents them from being broken, when removing them from one dish to another and also ensures them being served very hot.

5. All water is drained off all eggs at once by one movement viz lifting off upper portion, which prevents the possibility of any water being transferred either on to the toast or plate on which the eggs are served.

What I claim is:—

1. An egg poacher comprising a serving member and an egg separating portion bodily detachable in an instantaneous manner from the serving member to enable the latter to be alone despatched to the table, substantially as described.

2. An egg poacher comprising a serving member and an egg separating member bodily detachable therefrom and carrying means detachably connected to such serving member whereby the latter can be lifted into and out of a cooking vessel and be despatched minus the carrying means to enable the contents to be directly served at table.

3. An egg poacher comprising a serving member and an egg separating member bodily detachable therefrom and carrying means hingedly and detachably connected to such serving member for the purpose specified.

4. An egg poacher comprising a serving member, pierced lugs upon the underside thereof and a looped handle having lateral extensions adapted to be sprung into and out of engagement with the lugs aforesaid, for the purpose specified.

5. An egg poacher comprising a serving member formed with a number of imperforate hollows, an upper detachable portion forming a temporary extension of the hollows, and carrying handles hingedly and detachably connected to such serving member, such handles in one position being adapted to hold the upper portion upon the serving member and in another position to release it.

Signed at London, England, this 2nd day of November, 1920.

ELLEN SUSAN MUSGRAVE.